United States Patent [19]

Wade

[11] 3,860,622
[45] Jan. 14, 1975

[54] ORGANOTITANATE-BORATE COMPLEXES
[75] Inventor: Robert C. Wade, Ipswich, Mass.
[73] Assignee: Ventron Corporation, Beverly, Mass.
[22] Filed: June 4, 1973
[21] Appl. No.: 366,729

[52] U.S. Cl. ............................ 260/429.5, 252/431 R
[51] Int. Cl. ................................................ C07f 7/28
[58] Field of Search ................................ 260/429.5

[56] References Cited
UNITED STATES PATENTS

| | | | |
|---|---|---|---|
| 3,455,976 | 7/1969 | Wade | 260/429.5 X |
| 3,458,552 | 7/1969 | Hauck et al. | 260/429.5 X |
| 3,502,703 | 3/1970 | Wade | 260/429.5 X |
| 3,519,664 | 7/1970 | Wade | 260/429.5 |

OTHER PUBLICATIONS

Feld & Cowe, The Organic Chemistry of Titanium, Butterworth Inc., Washington D.C., (1965), pp. 140–141.

*Primary Examiner*—H. Sneed
*Attorney, Agent, or Firm*—J. Harold Boss, Esq.

[57] ABSTRACT

Organic titanates of the general formula $Ti(OR)_4$, react with organic borates of the general formula $B(OR')_3$, where R and R' are alkyl groups containing 1 – 18 carbon atoms, to form a 1 to 1 molar complex of the general formula $Ti(OR)_4 \cdot B(OR')_3$. These complexes are useful as catalysts and cross-linking agents for various polymers.

13 Claims, No Drawings

ORGANOTITANATE-BORATE COMPLEXES

BACKGROUND TO THE PRESENT INVENTION

The reaction of Group I–A and II–A metal alcoholates with boron esters is well known. Copaux described the reaction of triethylborate with sodium ethylate to form a crystalline product in 1898.

Steinberg "Organoboron Chemistry," Volume I, Interscience, New York (1964), devotes an entire chapter to coordination compounds derived from monohydric alcohols and phenols. According to Steinberg, "Reactions of trigonal coplanar boron compounds are characterized by acceptance of a neucleophile which causes the rehybridization of the boron atom from sp2 to sp3." All of the references to compounds cited in this chapter are limited to the complexes formed by Group IA and IIA metal alkoxides with boron esters, e.g.:

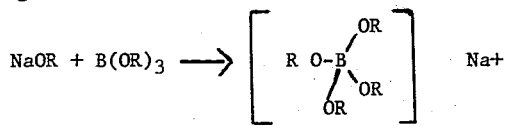

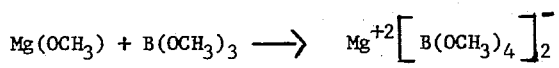

No mention is made of complexes that might be formed from other metal or metalloid alcoholates, with the exception that potassium tetraethoxy borate is converted to the less soluble thallium tetraethoxy borate by treatment with thallium acetate in ethanol solution.

THE INVENTION

I have found that one mole of an organic titanate, Ti-(OR)$_4$, will react with one mole of an organic borate B(OR')$_3$ where R and R' are alkyl groups containing 1 – 18 carbon atoms to form a complex of the general formula Ti(OR)$_4$:B(OR')$_3$. While I do not wish to be limited to any specific structure for these complexes, I believe they may have the ionic structure [Ti(OR)$_3$]$^{115}$ [B(OR')$_3$OR]$^-$ similar to other known metal organoborates. Considerable heat is involved when the reagents are mixed. The reactions are carried out in a dry atmosphere to prevent hydrolysis of the titanates and borates. While inert solvent such as hydrocarbons or chlorocarbons may be used, they are not necessary unless one of the starting materials is a solid at the reaction temperature. Normally, the reactions are started at room temperature. Since the reactions are exothermic, it may be found desirable to provide for cooling of the reaction mixture during the reaction. No restrictions in operating temperature range are necessary other than to those temperatures at which the reagents remain liquids; i.e., above their freezing points and below their boiling points.

Many of the complex reaction products have a much wider liquid range than their component reagents. This is of considerable advantage in shipping and handling these materials.

The products of this invention are excellent catalysts or catalyst components in polymerization reactions, transesterification reaction, cross linkers for thermosetting resins such as epoxies, phenolics and urea formaldehydes. In many cases, they are much less reactive than organic titanates, and provide for longer pot life when used as curing agents in resin systems, and are slower to hydrolyze.

EXAMPLES

1. Reaction of Ti(O i-C$_3$H$_7$)$_4$ and B(OCH$_3$)$_3$

A 250 ml and 2 neck reaction flask fitted with a magnetic stirrer, thermometer, and reflux condenser was charged with 35.5g of Ti(O i-C$_3$H$_7$)$_4$ (⅛ mole) (BP 230°C, M.P. 17°C).

To this stirred liquid was added 13 g (⅛ mole) of B(OCH$_3$)$_3$ by means of a hypodermic syringe. The temperature of the reaction mixture increased from 23°C at the start to 48°C 5 minutes later when all of the methyl borate had been added. The mixture was stirred for 30 minutes and then cooled to 5°C. No solids formed. Then the mixture was heated to 100°C and no reflux was noted. B(OCH$_3$)$_3$ boils at 68°C. This shows that no free methyl borate was present. There was recovered 48 grams of colorless liquid product which had the following analysis:
Ti = 12.08%, B = 2.65%, C = 45.7%, H = 9.9%
Ratio Ti=1 B=1 C=15 H=40
The complex may have the structure:

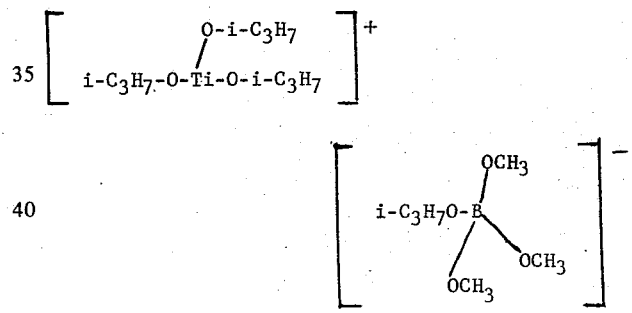

2. Reaction of Ti (O i-C$_3$H$_7$)$_4$ and B(O n-C$_3$H$_7$)$_3$

In a similar experiment 0.125 mole of Ti (O-i-C$_3$H$_7$)$_4$ was reacted with 0.125 mole of B(O n-C$_3$H$_7$)$_3$ (B P = 175°–180°C). The reaction temperature increased spontaneously from 26°C to 43°C. during the five-minute period that the propyl borate was added. The product of this reaction was a colorless liquid which had the following analysis:
Ti = 10.37%; B = 2.2%; C = 53.5% Ratio 1    0.95    20.6

3. The following experiments were carried out where 0.1 mole of the organoborate ester was added all at once to 0.1 mole of the organotitanate in a dry atmosphere at 25°C. The maximum temperature rise was noted in each case.

|    | Titanate       | g    | Borate      | g    | ΔT°C | Remark           |
|----|----------------|------|-------------|------|------|------------------|
| a. | Tetra butyl-   | 34   | Trimethyl-  | 10.4 | 12   | Yellow liquid    |
| b. | Tetrabutyl-    | 34   | Triethyl-   | 14.6 | 4    | Yellow liquid    |
| c. | Tetrabutyl-    | 34   | Tri n-hexyl-| 31.4 | 4    | Yellow liquid    |
| d. | Tetra i-propyl-| 28.4 | Triethyl-   | 14.6 | 26   | Colorless liquid |
| e. | Tetra i-propy- | 28.4 | Tri n-hexyl-| 31.4 | 21   | Colorless liquid |

4. To 112.6 g (0.1 mole) of tetrastearyl titanate (a solid material) was added 10.4 g (0.1 mole) of trimethyl borate. A temperature rise of 2°C was noted, and the product was a very viscous light yellow liquid at 25°C.

I claim:

1. The method of preparing a complex of the general formula $Ti(OR)_4 \cdot B(OR')_3$ where R and R' are alkyl groups which consists in mixing equimolar amounts of a tetraalkyl titanate containing from 12 to 72 carbon atoms with a trialkyl borate containing from 3 to 18 carbon atoms, and stirring the mixture until substantially all the trialkyl borate has reacted with the tetraalkyl titanate to form said complex.

2. The method as claimed by claim 1 wherein the tetraalkyl titanate is selected from the group consisting of tetraisopropyl titanate, tetrabutyl and tetrastearyl titanate, and the trialkyl borate is selected from the group consisting of trimethyl borate, triethyl borate and tri n-hexyl borate.

3. The method as claimed by claim 1 wherein the trialkyl borate is trimethyl borate.

4. The method as claimed by claim 3 wherein the tetraalkyl titanate is tetraisopropyl titanate.

5. The method as claimed by claim 3 wherein the tetraalkyl titanate is tetrabutyl titanate.

6. The method as claimed by claim 3 wherein the tetraalkyl titanate is tetrastearyl titanate.

7. The composition produced by the method as claimed by claim 1.

8. The composition produced by the method as claimed by claim 2.

9. The composition produced by the method as claimed by claim 3.

10. The composition produced by the method as claimed by claim 4.

11. The composition produced by the method as claimed by claim 5.

12. The composition produced by the method as claimed by claim 6.

13. The method as claimed by claim 1 wherein the reaction is conducted in the presence of an inert solvent for at least one of said reactants.

* * * * *